US008555086B2

(12) United States Patent
Royer et al.

(10) Patent No.: US 8,555,086 B2
(45) Date of Patent: Oct. 8, 2013

(54) ENCRYPTING DATA ON A NON-VOLATILE MEMORY

(75) Inventors: Robert Royer, Portland, OR (US); Sanjeev N. Trika, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 12/215,923

(22) Filed: Jun. 30, 2008

(65) Prior Publication Data

US 2009/0327759 A1    Dec. 31, 2009

(51) Int. Cl.
G06F 12/14    (2006.01)
G06F 12/10    (2006.01)
G06F 13/00    (2006.01)

(52) U.S. Cl.
USPC .......................... 713/193; 711/135; 711/155

(58) Field of Classification Search
USPC .................... 713/365, 193; 711/135, 155
See application file for complete search history.

(56) References Cited

U.S. PATENT DOCUMENTS

| 5,195,100 | A | * | 3/1993 | Katz et al. | 714/22 |
| 5,742,677 | A | * | 4/1998 | Pinder et al. | 380/242 |
| 7,134,025 | B1 | * | 11/2006 | Trimberger | 713/189 |
| 7,428,636 | B1 | * | 9/2008 | Waldspurger et al. | 713/164 |
| 2002/0108014 | A1 | * | 8/2002 | Lasser | 711/103 |
| 2003/0163631 | A1 | * | 8/2003 | Aasheim et al. | 711/103 |
| 2004/0193786 | A1 | * | 9/2004 | Inagaki et al. | 711/105 |
| 2005/0138012 | A1 | * | 6/2005 | Royer et al. | 707/3 |
| 2005/0144368 | A1 | * | 6/2005 | Chung et al. | 711/103 |
| 2008/0320252 | A1 | * | 12/2008 | Jansen et al. | 711/155 |
| 2009/0158085 | A1 | * | 6/2009 | Kern et al. | 714/6 |
| 2009/0222627 | A1 | * | 9/2009 | Reid | 711/135 |

OTHER PUBLICATIONS

Bisson et al., "Reducing Hybrid Disk Write Latency with Flash-Backed I/O Requests," Technical Report UCSC-SSRC-07-03, May 2007, 10 pages.*

* cited by examiner

*Primary Examiner* — Carl Colin
*Assistant Examiner* — Syed Zaidi
(74) *Attorney, Agent, or Firm* — Trop, Pruner & Hu, P.C.

(57) ABSTRACT

A non-volatile memory, such as a NAND memory, may be encrypted by reading source blocks, writing to destination blocks, and then erasing the source blocks. As part of the encryption sequence, a power fail recovery procedure, using sequence numbers, is used to reestablish a logical-to-physical translation table for the destination blocks.

16 Claims, 4 Drawing Sheets

ENCRYPTING DATA ON A NON-VOLATILE MEMORY

BACKGROUND

Non-volatile semiconductor memories, such as flash memories, are attractive for applications in which data is to be preserved in the event of a normal system shutdown/hibernation or power failure. Thus, a memory that is formed from flash memory devices may be used to store data in a disk cache or a solid state disk. Although a typical flash memory has a significantly faster access time than a magnetic storage device, unlike the magnetic storage device, the cells of the flash memory typically cannot be re-written without first being erased.

As a more specific example, before a bit of data is stored in a conventional flash memory cell, the cell is first erased. In this erased state, the cell is indicative of a particular logic state, such as a logic "one" state, for example. In a subsequent write operation to the flash memory cell, if a logic one is to be stored in the cell, then the state of the cell remains unchanged. However, if a logic zero is to be stored in the cell, then the cell is programmed to change the cell to a zero logic state. Thus, a typical write to a flash memory cell typically involves two memory operations: a first operation to erase the memory cell; and a second operation to program the logic state of the memory cell. These multiple operations, in turn, contribute to the overall time to write to the flash memory.

DETAILED DESCRIPTION

Figure 1:
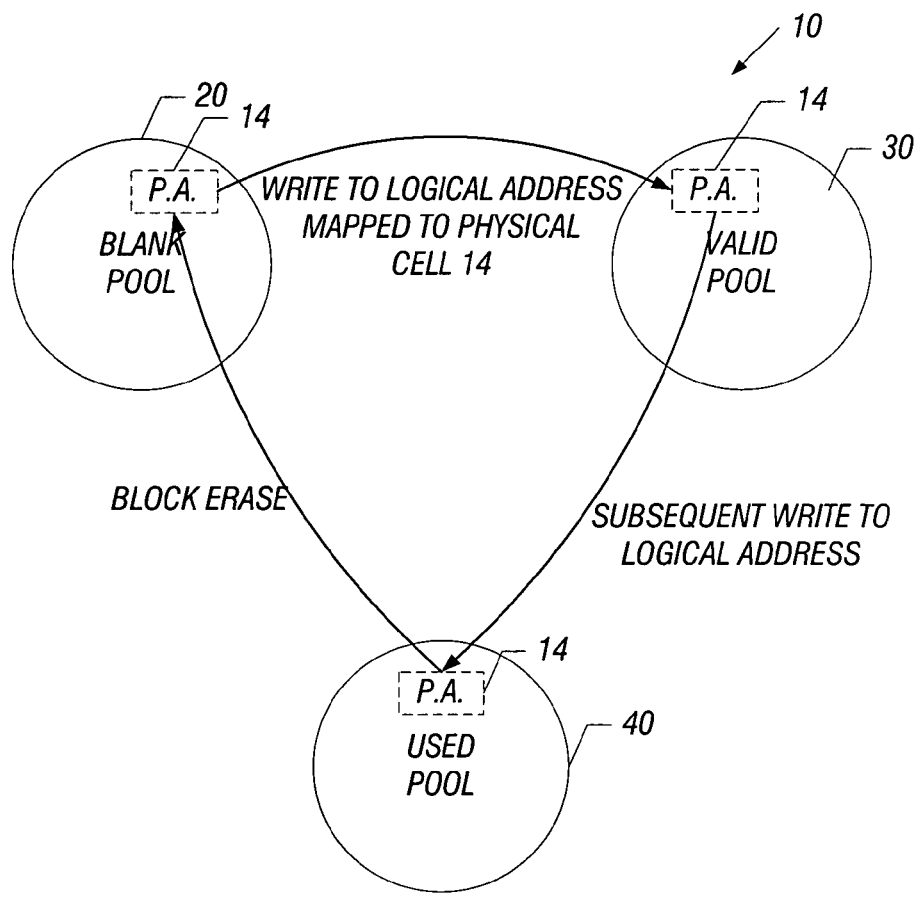
FIG. 1 is an illustration of a dynamic addressing scheme used with a non-volatile semiconductor memory according to an embodiment of the invention.

Referring to FIG. 1, in accordance with some embodiments of the invention, a dynamic addressing scheme 10 groups the physical addresses of a non-volatile memory into blank 20, valid 30 and used 40 pools. The blank pool 20 represents the unassigned physical addresses whose associated memory cells are erased, and are ready to be programmed and thus, are ready to be assigned to logical addresses. The valid pool 30 represents physical addresses that are associated with memory cells that store valid data and are assigned to logical addresses. The used pool 40 represents the physical addresses that no longer store valid data, are no longer associated with logical addresses and are to be erased. The physical addresses of the used pool 40 are regrouped into the blank pool 20 when block erase operations are used to erase contiguous blocks (64 pages, for example) of physical addresses. The block erase is more efficient than erasing the physical addresses one at a time in response to each logical write operation, and additionally, the non-volatile memory (such as a NAND flash memory, for example) may only permit block erases.

As a more specific example, an exemplary physical address 14 (associated with a set of memory cells, or memory location) of the non-volatile memory may transition between the blank 20, valid 30 and used 40 pools in the following manner. Initially, such as at startup of the system that incorporates the non-volatile semiconductor memory or after being erased, the physical address 14 belongs to the blank pool 20. In other words, by virtue of being in the blank pool 20, the physical address 14 is available for assignment to a particular logical address. Thus, when data is written to a particular logical address, the physical address 14 is assigned to the logical address so that the data is stored at the physical address 14; and the physical address 14 then becomes part of the valid pool 30. Another write to the physical address 14, however, cannot occur without the memory cells that are associated with the physical address 14 being erased. Therefore, when the next write occurs to the same logical address, another physical address is assigned to the logical address, and the memory content that is associated with the physical address 14 becomes invalid, or "used," as the physical address 14 becomes part of the used pool 40.

The memory cells associated with the physical address 14 are not necessarily immediately erased upon becoming "used," but rather, these memory cells are erased in a block erase operation. At this time, the physical address 14 once again becomes part of the blank pool 20 and may be assigned to another logical address.

Figure 2:
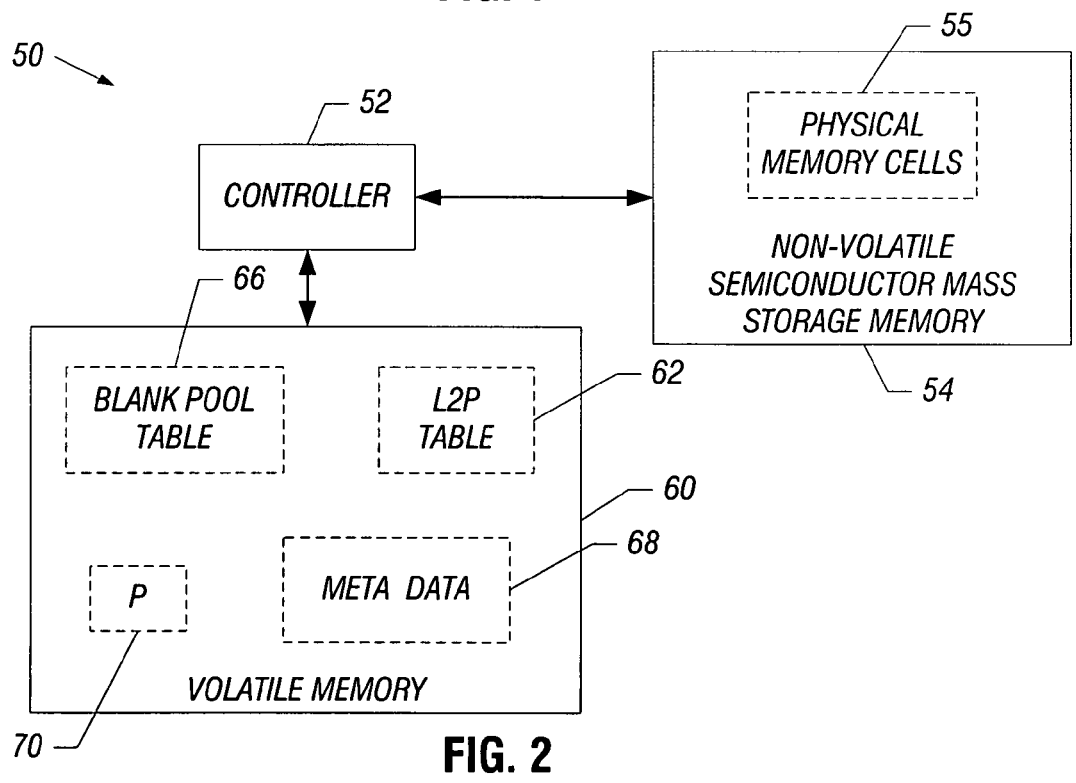
FIG. 2 is a block diagram of a memory system according to an embodiment of the invention.

Referring to FIG. 2, in accordance with some embodiments of the invention, a memory system 50 uses the above-described dynamic addressing scheme 10 and may be used in connection with a non-volatile semiconductor mass storage memory 54 (herein called the "non-volatile memory 54"), such as a NAND flash memory. The non-volatile memory 54 contains an array of physical memory cells 55 that are addressed using physical addresses. In accordance with some embodiments of the invention, a controller 52 of the memory system 50 performs dynamic addressing by converting between logical and physical address spaces. More specifically, in accordance with some embodiments of the invention, the controller 52 is coupled to a volatile memory 60, such as a dynamic random access memory (DRAM), for example. The volatile memory 60 stores a logical-to-physical translation table (herein called a "L2P table 62"), which the controller 52 uses for purposes of mapping the logical addresses to the physical addresses of the memory 54. This mapping continually changes, and thus, the controller 52 continually updates the L2P table 62 to track the remapping of each logical address to different physical addresses.

As also depicted in FIG. 2, in accordance with some embodiments of the invention, the volatile memory 60 stores a blank pool table 66, a table that indicates which of the physical addresses of the memory 54 are included in the blank pool 20 (see FIG. 1). Thus, when the controller 52 is to perform a write operation to a logical address, the controller 52, in general, selects an available physical address from the blank pool table 66, updates the L2P table 62 to remap the logical address to the selected physical address, and performs the corresponding write operation to the non-volatile memory 54 at the selected physical address.

Among the other data that may be stored in the volatile memory 60, in accordance with some embodiments of the invention, the volatile memory 60 may store meta data 68 that contains (among other possible information) information regarding the consumption state of the memory content that is stored at each physical address. In accordance with some embodiments of the invention, for each addressable location of the non-volatile memory 54, the meta data 68 indicates whether the data content that is stored in the location is used, valid or blank. In addition to the blank pool table 66, L2P table 62 and the meta data 68, the volatile memory 60 may store program instructions 70 that, when executed, cause the controller 52 to perform one or more of the physical write, address translation, power failure recovery, and encryption techniques that are disclosed herein.

Thus, to summarize, the controller 52 uses the volatile memory 60 to store information that is indicative of the logical-to-physical address mapping and indicative of the states of the addressable memory locations of the non-volatile memory 54. It may be advantageous to store such information in the volatile memory 60, as compared to a non-volatile memory (such as the memory 54), due to the relatively faster access times to the volatile memory 60, given the high number of accesses used to maintain this information. The volatile information may be stored to non-volatile memory at key events, e.g., shutdown, hibernate, suspend, low power detection, etc., and restored therefrom on subsequent reboot/resume. However, in general, a potential challenge with this technique is that the information that is stored in the volatile memory 60 is lost in the event of a power failure to the memory system 50. Although periodic back-up of the contents of the volatile memory 60 may be made, these back-ups may be insufficient, by themselves, to recover the lost information. Therefore, upon recovery from a power failure, if not for features described below, the controller 52 would be unaware of the logical-to-physical mapping and the consumption states of the various addressable memory locations of the volatile memory 54 and thus, would be unable to reconstruct the information that was stored in the volatile memory 60.

In accordance with embodiments of the invention described herein, the controller performs a write operation to the non-volatile memory 54 for each logical write operation. To permit recovery of the information (such as the information that is stored in the L2P table 62 and the blank pool table 66, for example) that is stored in the volatile memory 60 after a power failure, the controller 52, in each physical write operation, stores sequence information, such as a time stamp or sequence number, in the non-volatile memory 54. More specifically, in accordance with some embodiments of the invention, the controller 52 generates a global sequence number for each write operation to the non-volatile memory 54. The controller 52 increments the global sequence number for each write operation so that the sequence number has an increasing value (for example) for the write operations. As described below, the sequence numbers are used by the controller 52 after a power failure to reconstruct the timeline of prior write operations (occurring before the power failure) to determine which addressable locations of the non-volatile memory 54 store valid data (and thus, also to determine which locations store used data).

Figure 3:
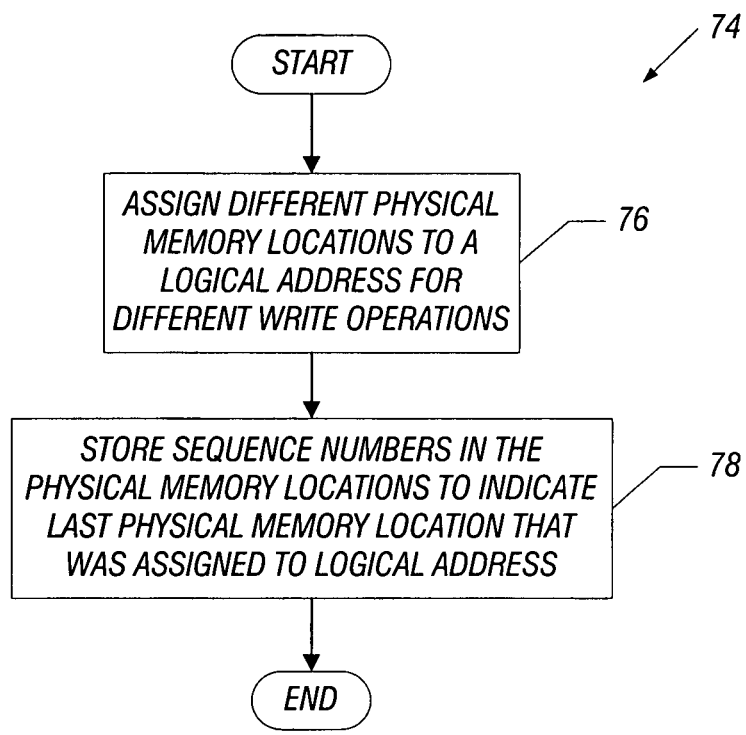
FIG. 3 is a flow diagram depicting a technique for storing sequence numbers according to one embodiment of the invention.

Referring to FIG. 3, to summarize, in accordance with some embodiments of the invention, the controller 52 generally performs a technique 74 in connection with logical write operations. Pursuant to the technique 74, the controller 52 assigns (block 76) different physical memory locations to a logical address for different write operations. Thus, for a first write operation to a particular logical address, the controller 52 writes to a first physical address of the non-volatile memory 54; and for the next write operation to this logical address, the controller 52 writes to a second physical address of the non-volatile memory 54. Pursuant to the technique 74, the controller 52 stores (block 78) sequence numbers and logical addresses in the physical memory locations that collectively indicate the last physical memory location that was assigned to the logical address. As discussed above, the sequence numbers permit the controller 52 to rebuild the information in the volatile memory 60 after the occurrence of a power failure.

After data is stored in a particular physical address, the data stored in the corresponding memory location becomes used, and thus, the corresponding physical address becomes "invalid" for the logical address. Thus, in accordance with some embodiments of the invention, the entry may store a predetermined value (such as a value of all "1's", for example) to indicate an invalid physical address.

Figure 4:
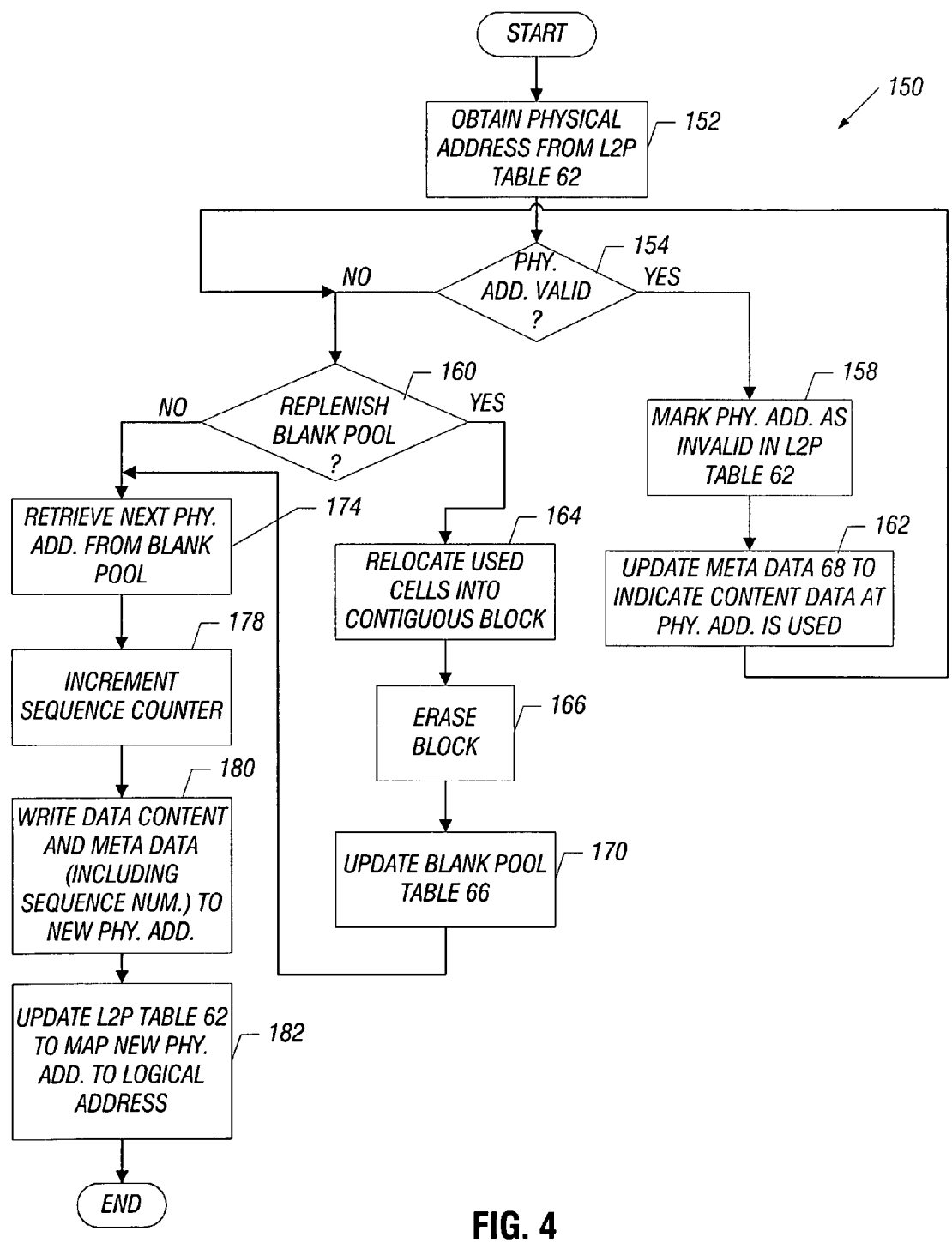
FIG. 4 is a flow diagram for a write operation according to one embodiment.

Referring to FIG. 4, the controller 52 (see FIG. 2) may generally perform a technique 150 in response to a logical write operation. The logical write operation targets a logical address and indicates data to be stored at the logical address. Pursuant to the technique 150, the controller 52 obtains a physical address for the logical address, such as by using the logical address to look up the particular physical address from the L2P table 62 (see FIG. 2), as depicted in block 152. The controller 52 then determines (diamond 154) whether the physical address is valid. This is quite often the case during normal operation, although a particular physical address may be associated with the blank pool after initial power up of the memory system 50 (see FIG. 2).

If the controller 52 determines (diamond 154) that the current physical address is valid, the controller 52 marks (block 158) the current physical address as invalid in the L2P table 62. Thus, if the current physical address currently stores valid data, pursuant to the dynamic addressing scheme discussed herein, another physical address is used (as described further below) to store the data that is the subject of the current logical write operation. Next, the controller 52 updates the volatile meta data 68 to indicate that the content data at the current physical address.

Either after block 162 or after determining (diamond 154) that the current physical address is invalid, the controller 52 determines (diamond 160) whether it is time to replenish the blank pool 20. For example, in some embodiments of the invention, the controller 52 may monitor the number of physical addresses that make up the blank pool 20. Upon determining that this number has fallen below a predetermined threshold, the controller 52 may take actions to replenish the blank pool 20. For example, these actions may include relocating (block 164) used cells into a contiguous block. Thus, this relocation may involve moving addressable memory locations of the non-volatile memory 54 that are valid and used with associated updates to the volatile data 60. Once this contiguous block is established, the controller 52 erases the block, as depicted in block 166. Subsequently, the controller 52 updates (block 170) the blank pool table 66.

Regardless of whether the controller 52 replenishes the blank pool 20, the controller 52, pursuant to the technique 150, subsequently retrieves (block 174) the next physical address from the blank pool 20 (to replace the current physical address) and increments (block 178) a sequence counter.

The controller 52 then writes (block 180) the content and meta data (which includes the sequence number and logical address) to the new physical address.

Subsequently, the controller 52 updates (block 182) the L2P table 62 to map, or assign, the new physical address to the logical address.

For purposes of reconstructing the L2P table 62 after a power failure, the controller 52 uses a temporary table that includes N two tuple entries, each of which is associated with a particular logical address. Thus, the controller 52 may use a logical address pointer for purposes of looking up a particular entry. In accordance with some embodiments of the invention, each entry includes a field that indicates a physical address for the logical address and a field that indicates the last (and largest) sequence number that has been found so far. Therefore, the controller 52 updates the entries as the controller 52 scans through the non-volatile memory 54 (after a power failure) so that at the end of the scan, each entry indicates the most recently used physical address for each logical address (i.e., the physical address having the highest sequence number).

Figure 5:
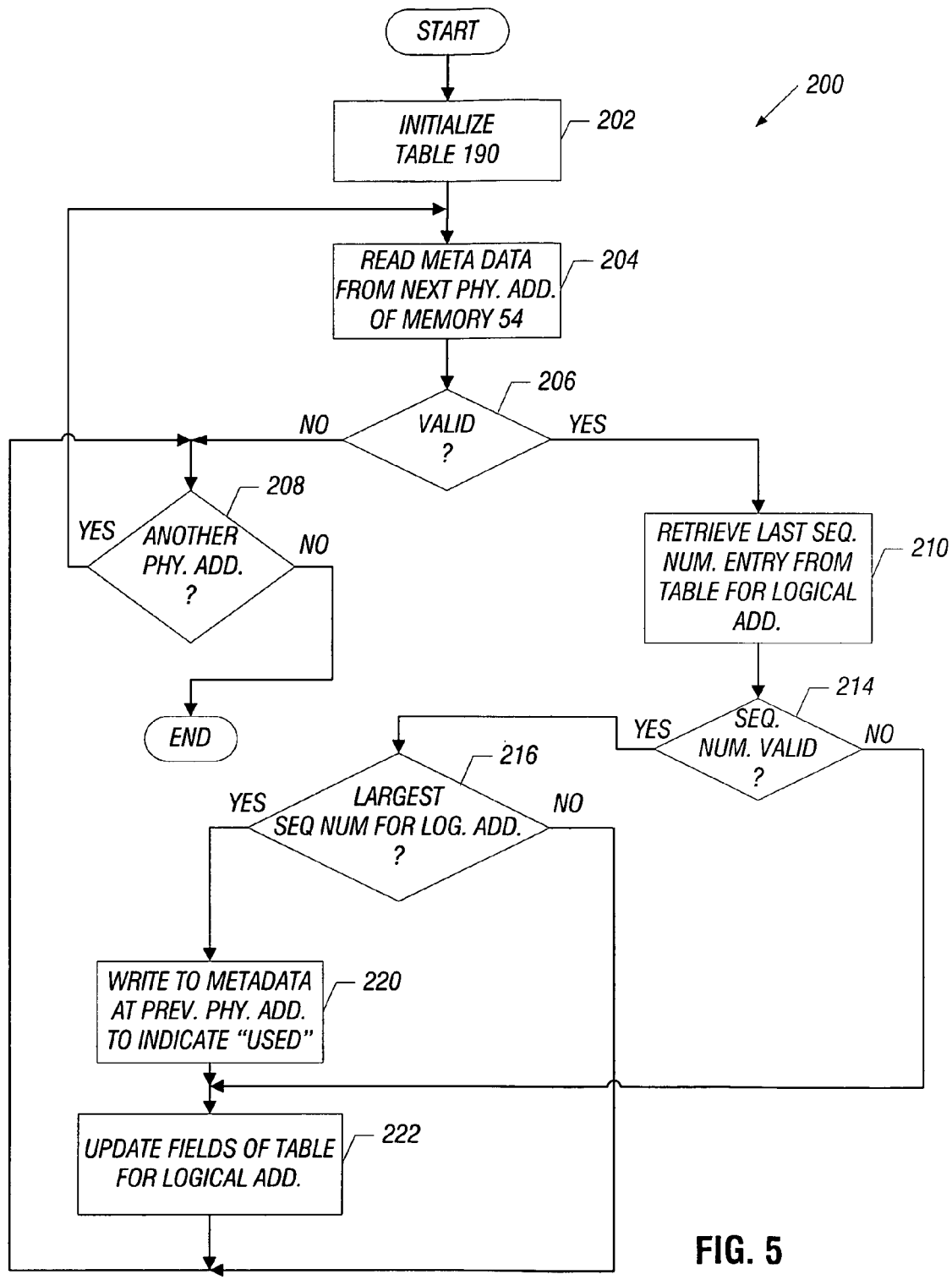
FIG. 5 is a flow diagram depicting a technique to reconstruct the logical-to-physical translation table after a power failure according to an embodiment of the invention.

As a more specific example of the use of the table 190, in accordance with some embodiments of the invention, the controller 52 generally performs a technique 200 that is depicted in FIG. 5. Pursuant to the technique 200, the controller 52 initializes (202) the table. For example, this initialization may include storing values (such as a "−1," for example) in each entry (of the table) that do not correspond to a physical address or last sequence number, to indicate the initialized status of the entry. The controller 52 next reads (block 204) meta data from the next physical address of the non-volatile memory 54. If the meta data indicates that memory content is invalid, then the controller 52 determines (diamond 208) whether there is another physical address to process and if so, returns to block 204.

If the controller 52 determines (diamond 206) that the content data is valid, then the controller 52 retrieves (block 210) the last sequence number entry from the table for the particular logical address that is associated with that physical address. Thus, an indication of this logical address is stored in the memory location of the non-volatile memory 54. If the controller 52 determines (diamond 214) that the sequence number is valid (i.e., the controller 52 determines that the sequence number is not the initialized value), then the controller 52 determines (diamond 216) whether the current sequence number is the largest sequence number for the logical address so far. If not, then control returns to diamond 208. Otherwise, the last physical address used for the logical address (as indicated so far in the scan) has been located, and the controller 52 writes (block 220) to the meta data at the previous physical address to indicate that the corresponding content data is "used." Subsequently, the controller 52 updates (block 222) the fields of the table for the corresponding logical address. Control then proceeds to diamond 208 in which the controller 52 determines whether another physical address is to be processed. If not, then the controller 52 has completed the scan, and the table has been constructed. It is noted that absent the entries, the table constitutes the reconstructed L2P table 62. Thus, in accordance with some embodiments of the invention, the controller 52 may extract the data 194 at the conclusion of the scan to reconstruct the L2P table 62.

Encryption migration involves the initial migration of user data from an unencrypted state to encrypted state. It can be done during run time or initialization. In NAND memories, NAND algorithms relocate data at run time. Thus, while newly written/rewritten data may be encrypted, stale copies of the user data remain on the NAND and present a security hole, since these unencrypted copes of data may be read by unauthorized users of malware. In order to implement encryption, the existent blocks are scanned during encryption migration to determine which blocks are blank and which contain data that must be encrypted. Blocks that need to be encrypted are added to a list of blocks to encrypt and blocks that are erased are added to a list of erased blocks.

For example, in one embodiment, blank blocks can be identified by reading both the first and last pages in the block. Other techniques may also be used. A block does not require encryption if it is defective, blank, or is already encrypted.

Then, blocks that require encryption are encrypted though the relocation process described previously and blocks with stale data are then erased. Each source block that requires encryption is scanned. Then data from a source block is read, encrypted if necessary, and written to a previously blank destination block. All non-blank pages in the source block may be encrypted in some embodiments. In other embodiments, selected pages may not be encrypted, such as pages in regions associated with non-encrypted disks or pages associated with disk caches that are caching non-encrypted disks, or pages associated with Windows ReadyBoost, whose volumes are already encrypted, or by simply non-encrypting and writing stale pages. The source block is then erased, once the required encryption has been completed and the data has been rewritten to the destination block.

Since pages are relocated during encryption migration, the L2P table 62 is updated to determine where the data is stored from a client/user perspective. In one embodiment, the power fail recovery methods described above are used to recover this information. For this purpose, the device is marked as having an improper shutdown when starting the encryption migration and the power fail recovery procedure is initiated once migration completes.

In some embodiments, error handling during encryption migration may involve adding a block to the device's defect map and marking the corresponding logical block as defective, in the case of repeated failures. In the case of single page read errors, the reads may be retried. Blocks that experience erase failures are added to the device's defect map in some embodiments. Write failures may involve relocating data from the defective block to another blank block, adding the defective block to the device's defect map, and erasing the defective block. Any block that is added to the defect map is also erased to clear out any remaining user data.

In some embodiments, information is periodically saved to the array 55 about how many blocks have been encrypted and which blocks have been encrypted. This enables encryption migration to be resumed faster in case of interruption, for example, by a power failure during encryption migration.

Figure 6:
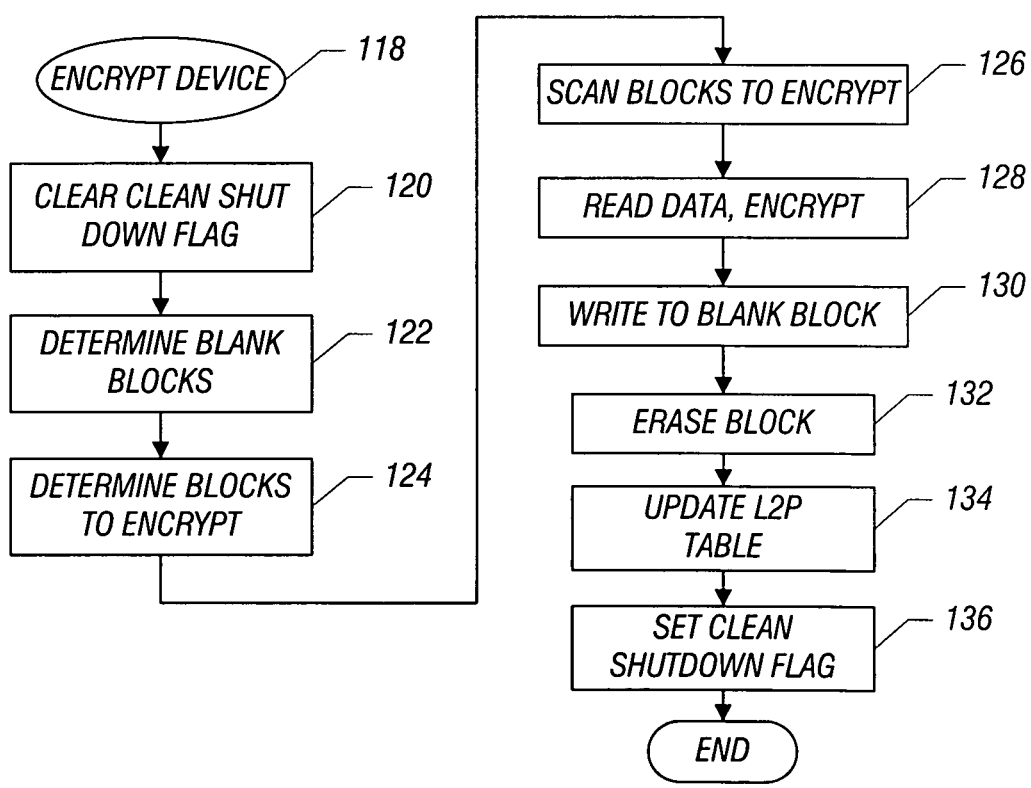
FIG. 6 is a flow diagram depicting a technique for encrypting data.

Referring to FIG. 6, in accordance with some embodiments, the encryption migration begins by clearing a non-volatile flag, called clean shutdown, to specify an improper shutdown, as indicated in block 120. Files for the "blocks to encrypt" list and the "erased blocks" are set. For blocks that are not defective, blank blocks are detected, as indicated in block 122. If the block does not have data (i.e. is blank), then the block is erased and is added to erased block file.

Otherwise, a check determines whether the block requires encryption (block 124). For example, some blocks may already be encrypted or some blocks may have both valid and used data that only belongs to regions that do not require encryption. Blocks that need to be encrypted are added to the blocks to encrypt list.

Then, the actual encryption begins for each block in the blocks to encrypt list (block 126). If the block is not encrypted and the block is not an erased block, then the destination block is set equal to the first block in the erased blocks file in one embodiment. Of course, any block from the erased blocks file can be used. The data is read from the source block, encrypted (block 128), and then written to a blank block (block 130). Then, the destination block is removed from the erased blocks file. For each page in the block, the data and the metadata from the page is read and stored in a buffer. If the page requires encryption, regardless of whether the page contains used or valid user data, then the page is encrypted. Then the write buffer pointer is moved to the next page in the destination block. The block is then erased when all the pages have been processed (block 132). This ensures that no stale data is left in the source block. Thereafter, the block that has just been erased is added to the erased block list.

Finally, a power fail recovery algorithm is run to reconstruct the L2P table (block 134). The reconstructed L2P table is saved and a non-volatile flag clean shutdown is set to specify a proper shutdown (block 136).

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   setting a flag to indicate an improper shutdown;
   storing a mapping table in a volatile memory;
   identifying in a memory controller a first set of blocks of a non-volatile memory that are erased;
   identifying in the memory controller a second set of blocks of the non-volatile memory that are not erased;
   selecting in the memory controller the second set of blocks of the non-volatile memory for encryption;
   encrypting at least one of the second set of blocks by reading unencrypted data from the at least one of the second set of blocks and writing encrypted data to at least one of the first set of blocks;
   erasing the at least one of the second set of blocks;
   in response to completing the encryption, updating the mapping table by applying a power fail recovery procedure, wherein the mapping table comprises logical-to-physical translations for the at least one of the first set of blocks, and
   setting the flag to indicate a proper shutdown.

2. The method of claim 1 including determining erased blocks by reading portions of the blocks.

3. The method of claim 1 including preparing a list of erased blocks and a list of blocks that need encryption.

4. The method of claim 1 including encrypting some, but not all, of the pages of a block.

5. The method of claim 1 wherein using a power fail recovery procedure includes using sequence numbers.

6. The method of claim 1 wherein encrypting blocks includes encrypting blocks at run time.

7. The method of claim 1 including changing a sequence number in the same way upon each successive operation of writing encrypted data, storing the sequence number in the non-volatile memory, and using the stored sequence number to reconstruct write operations to the non-volatile memory.

8. The method of claim 1 including updating the table in a volatile memory.

9. The method of claim 1 wherein updating the table to include the logical-to-physical translations for the at least one of the first set of blocks is performed only by using the power fail recovery procedure.

10. A memory comprising:
    an array of non-volatile memory cells:
    a volatile memory, said volatile memory including a mapping table; and
    a controller coupled to the array and the volatile memory, said controller to:
      set a flag to indicate an improper shutdown;
      identify blocks in said array that are erased,
      select blocks in said array other than said erased blocks for encryption,
      encrypt the selected blocks by reading unencrypted data from the selected blocks and writing encrypted data to the erased blocks,
      erase the selected blocks,
      in response to completing the encryption, update the mapping table by applying a power fail recovery procedure, wherein the mapping table comprises logical-to-physical translations for said destination blocks, and
      set the flag to indicate a proper shutdown.

11. The memory of claim 10, said controller to determine erased blocks by reading portions of the blocks.

12. The memory of claim 10, said controller to prepare a list of erased blocks and a list of blocks that need encryption.

13. The memory of claim 10, said controller encrypting some, but not all, the pages of a block.

14. The memory of claim 10, said controller to use a power fail recovery procedure using sequence numbers to update said table.

15. The memory of claim 10, said controller to change a sequence number in the same way upon each successive operation of writing encrypted data, store the sequence number in the non-volatile memory, and use the stored sequence number to reconstruct write operations to the non-volatile memory.

16. The memory of claim 10, wherein the non-volatile memory cells are NAND memory cells.

* * * * *